INVENTOR.
ALBERT R. THOMPSON
BY Philip A. Minnis
ATTORNEY

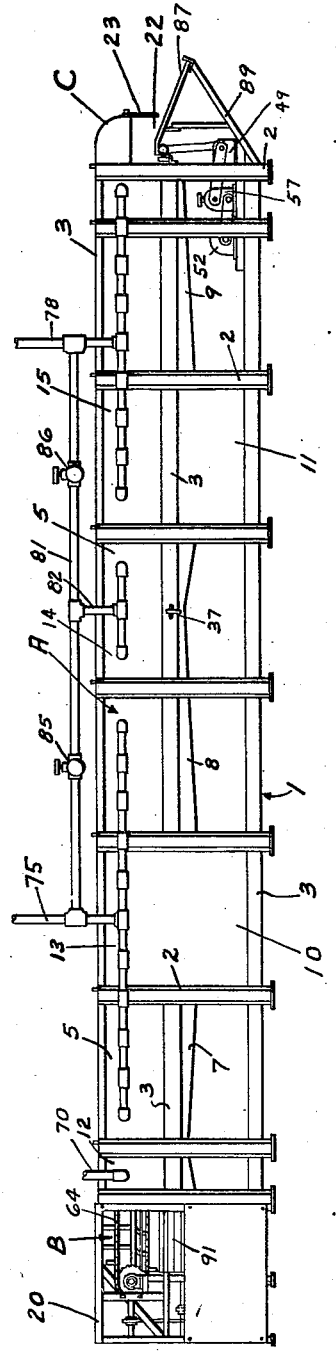

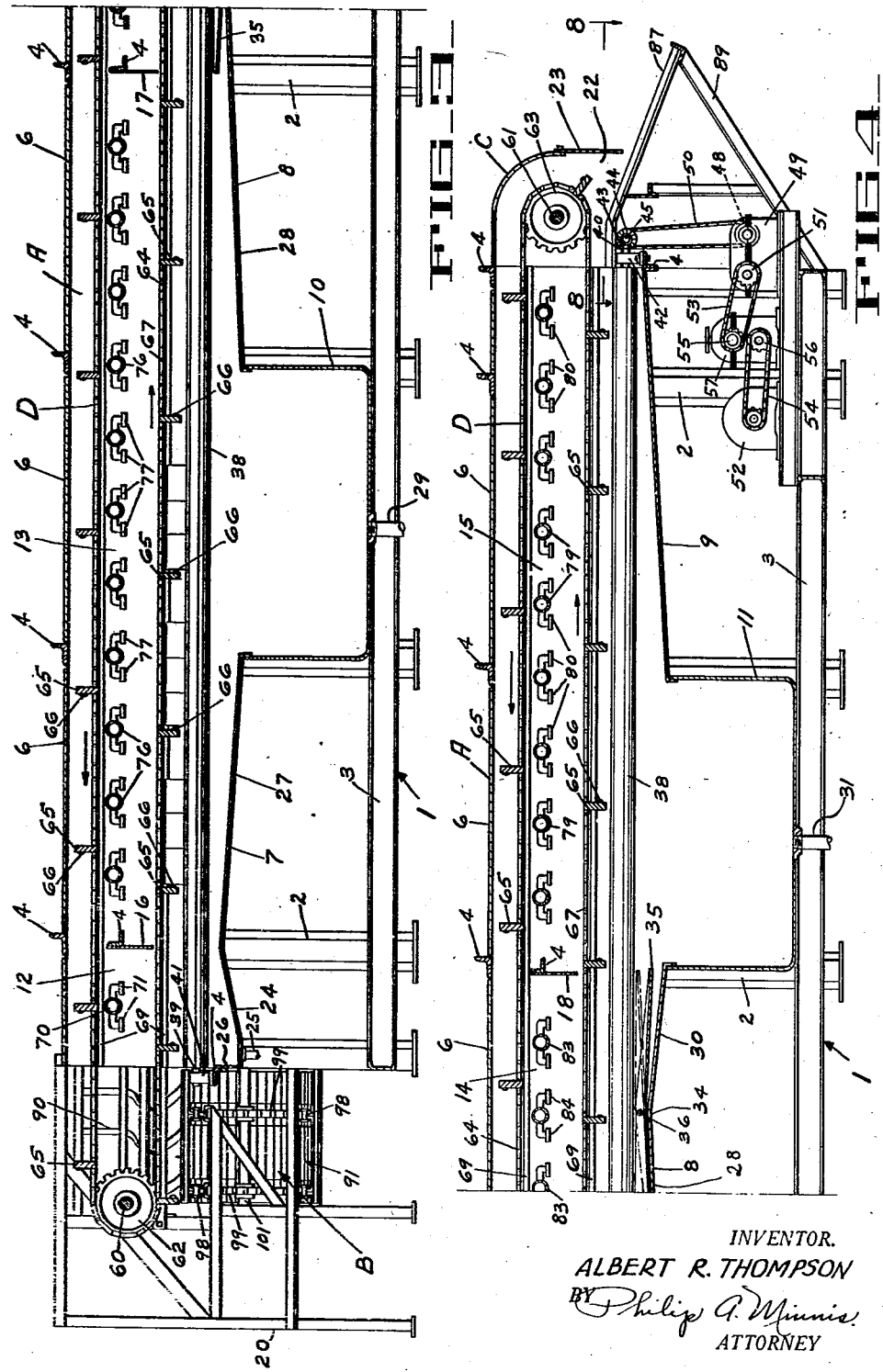

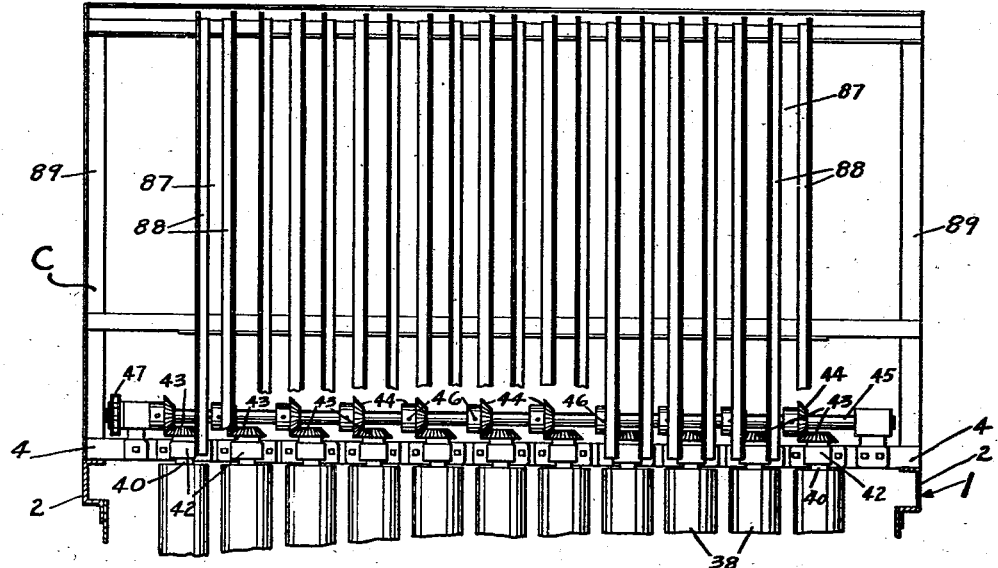
FIG_8_
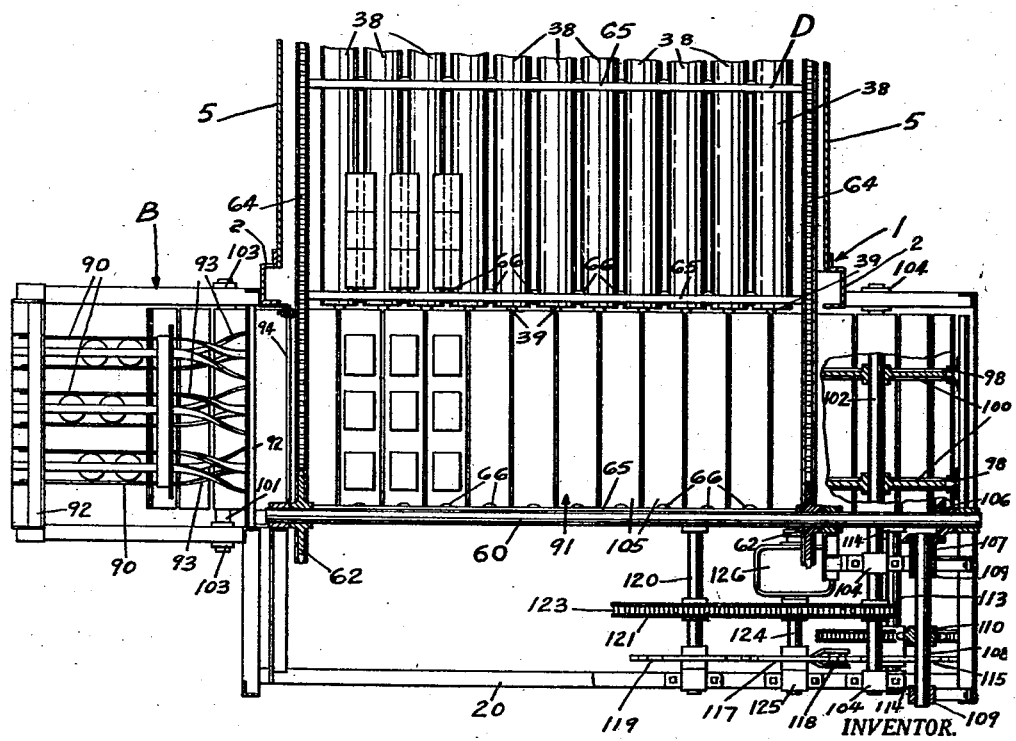
FIG_7_
INVENTOR.
ALBERT R. THOMPSON
BY Philip A. Minnis
ATTORNEY.

Patented Sept. 8, 1942

2,295,273

UNITED STATES PATENT OFFICE 2,295,273

LONGITUDINAL ROLL COOKER

Albert R. Thompson, Los Gatos, Calif., assignor to Food Machinery Corporation, San Jose, Calif., a corporation of Delaware Application June 13, 1939, Serial No. 278,853

14 Claims. (Cl. 126—272)

The present invention appertains to apparatus for treating comestibles in closed containers by application of a treating medium exterior thereof.

More specifically, the present invention relates to a cooking apparatus of the longitudinal roll type for sterilizing the contents of cans by subjecting the same to cooking temperatures during rotation of the cans and agitation of the contents thereof.

It is one object of the present invention to provide an apparatus of the nature referred to herein for controlling the period of treatment of comestibles in closed containers, as well as the agitation thereof during the treating process.

Another object of the present invention is to provide a cooker for treating the contents of closed containers by independently controlling the cooking period of said contents and the agitation thereof.

A further object of the present invention is to provide a simplified cooking apparatus which comprises a heating and a cooling section and means for controlling the cooking or cooling period of comestibles in closed containers independently of the movement of said containers and the agitation of the contents thereof.

Other and further objects and advantages of the present invention will become apparent from the following description and drawings, in which:

Fig. 1 is a side elevation of a longitudinal roll type cooker of the construction of the present invention.

Fig. 2 is a diagram of the piping arrangement for admission of treating medium to various sections of the apparatus.

Figs. 3 and 4 illustrate longitudinal sections through the entire machine, Fig. 4 being the continuation of the right hand portion of Fig. 3.

Fig. 7 is a plan view of the feeding mechanism shown in Fig. 5.

Fig. 8 is a plan view of the discharge portion of the machine, certain parts being broken away.

Figure 5:
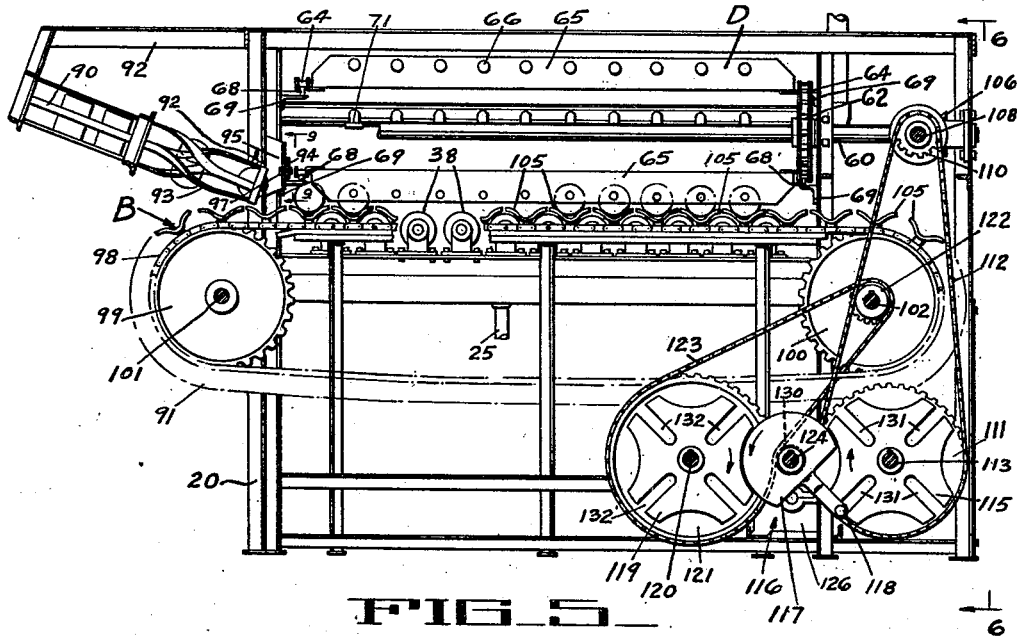
Fig. 5 shows an enlarged transverse sectional view of the feeding mechanism of the machine.

Referring now to the drawings, and primarily to Figs. 1, 3, and 4, I designates the frame structure of the apparatus, which consists of uprights 2 and horizontal and transverse frame members 3 and 4, respectively. The upper portion of the frame structure is provided with side walls 5 and top plates 6 adapted to form, in conjunction with drain pans 7, 8, and 9 attached to collector tanks 10 and 11, an enclosed longitudinally extending treating chamber A divided into a plurality of sections or compartments; i. e., a wash section 12, a cooking section 13, intermediate section 14, and cooling section 15 by means of flexible apron members 16, 17, and 18, in a manner as will be clearly seen from Figs. 3 and 4.

Connected to the frame structure above referred to and adjacent the wash section 12 of the machine is a feeding mechanism generally indicated at B supported by a frame 20 forming a continuation of the frame structure 1. The discharge end of the machine, generally indicated at C, is provided with a discharge opening 22 closed by a flexible apron 23.

The drain pan 7 comprises a portion 24 (see Figs. 3 and 4) declining toward a drain pipe 25, which is preferably connected with the sewer, forming with a vertical portion 26 and the side walls 5 a trough structure for collecting wash fluid from the wash section 12 of the machine for disposal thereof. The other portion 27 of the drain pan 7 declines toward the hot water collector tank 10 positioned within the frame structure of the machine below the cooking compartment 13. In a similar manner a portion 28 of the drain pan 8 declines toward the collector tank 10, so that treating fluid collected from the cooking section 13 within the tank 10 may be withdrawn therefrom through a pipe line 29 and used again during the operation of the machine. The cold water collection tank 11 positioned below the cooling compartment 15 of the apparatus is adapted to cooperate with a declining portion 30 of the drain pan 8 and the declining drain pan 9 for collecting cooling fluid admitted into the cooling chamber 15 of the apparatus so that the same may be withdrawn therefrom through a pipe line 31 and delivered to a cooling tower to condition the fluid for re-use if this should be desirable.

Positioned above an apex portion 34 formed by the oppositely declining portions 28 and 30 of the drain pan 8 is a transfer chute 35 pivotally supported by a shaft 36 within the frame structure of the machine and provided with a control lever 37 for manual operation permitting positioning of the transfer chute into predetermined positions at which it will collect treating fluid admitted into the intermediate treating chamber 14 of the machine and direct the same, if the chute is inclined in the direction of portion 28, toward collector tank 10, or if the chute is positioned in an opposite direction from that above referred to, into collection tank 11.

Extending through the entire length of the treating chamber A of the machine are horizontally positioned longitudinally extending cylindrical rolls 38 rotatably supported by means of stud shafts 39 and 40 within bearings 41 and 42 respectively, positioned upon transverse frame members 4 of the frame structure 1. The stud shafts 40 extend somewhat beyond their corresponding bearings 42 and are provided at their ends with bevel gears 43 fixed thereto and intermeshing with bevel gears 44 secured to a transverse drive shaft 45 for rotation therewith by means of pins 46 or the like. Keyed to shaft 45 is a sprocket wheel 47 operatively interconnected with a sprocket wheel 48 of a gear reduction box 49 by means of a drive chain 50. The sprocket wheel 48 is interconnected by means of a set of reduction gears (not shown) with a sprocket wheel 51 operatively connected with the sprocket wheel 52 by means of drive chains 53 and 54 and sprocket wheels 55 and 56 of a variable speed control 57, which may be operated to increase or decrease the speed of rotation of the rolls 38.

The rolls 38 are positioned adjacent each other within the frame structure of the machine so as to form valleys therebetween for supporting cylindrical cans or similar containers with their axes parallel with the axes of the rolls and for rotating said cans upon rotation of the rolls to thereby agitate the comestible contents thereof.

Mounted above the rolls 38 and extending longitudinally over the entire length of the machine is a can shifting mechanism D including transverse shafts 60 and 61, rotatably mounted within the frame structures 20 and 1 respectively, and positioned adjacent the side walls of the treating chamber. Pairs of sprocket wheels 62 and 63 around which endless carrier chains 64 are trained are keyed to the shafts 60 and 61, and attached to the carrier chains in spaced relation are pusher bars 65 provided with rubber tips 66 for purposes as will be explained later on. These pusher bars 65 are secured to certain links of the carrier chains in such a manner that they will depend from the lower runs 67 of the carrier chains so as to engage with their rubber tips 66 the ends of cans supported by said rolls within the valley portions thereof for shifting said cans longitudinally along the rolls upon operation of the can shifting mechanism D.

The rubber tips 66 of the pusher bars engage the ends of the cans and hold the same in spaced relationship with respect to the pusher bars 65, thereby permitting a free rotation of the cans incident to the forward shifting thereof. To prevent sagging of the upper and lower runs of the chains 64 the same are supported by guide rails 68 carried upon brackets 69 secured to the uprights 2 of the frame structure 1, as shown by Fig. 5.

A pipe 70 leading to the wash section 12 of the machine and extending transversely across the same above the rolls 38 is provided with a plurality of spray nozzles 71 for discharging washing fluid upon the cans for cleaning the same.

A supply conduit 75 leading to the machine from any convenient source of hot water supply is provided with a plurality of branch pipes 76 extending into the cooking compartment 13 through the side walls 5 thereof, and positioned intermediate the upper and lower runs of the endless carrier chains 64 above referred to. Each of these branch pipes 76 carries a plurality of spray nozzles 77 corresponding in number and arrangement with those on the pipe 70, and adapted to direct fluid discharged therefrom toward the cans supported within the valley portions between the rolls 38. In a like manner, a conduit 78 connected to a source of cold water supply is provided with a plurality of branch pipes 79 extending into the cooling compartment 15 of the machine. These branch pipes 79 are positioned intermediate the upper and lower runs of the carrier chains 64 and are provided with nozzles 80 similar in number and arrangement to those on the pipe 70, for spraying a cooling medium on the cans supported by rolls 38. The supply conduits 75 and 78 are interconnected by means of a by-pass conduit 81 including a downwardly extending pipe portion 82 carrying branch pipes 83 extending into the intermediate treating compartment 14 and being provided with spray nozzles 84 similarly to the pipes 70, 76, and 79. The by-pass conduit 81 is provided with a control valve 85 positioned between the conduits 75 and 82 and a control valve 86 positioned between the conduits 78 and 82. When the control valve 86 is closed and valve 85 is opened, hot water may be admitted to the branch pipes 83 of the intermediate section, and by closing of the control valve 85 and opening of the valve 86 cold water may be supplied thereto. In other words, by admitting hot or cold water to the intermediate section 14 of the apparatus, the cooking or cooling period may be increased or reduced according to the requirements of practice.

The discharge end C of the machine below the discharge opening 22 comprises a plurality of discharge chutes 87, each one formed by cooperating angle irons 88 extending from a position adjacent the ends of each pair of rolls 38 and the valley portions formed thereby in a declining direction outward of the machine for discharging cans transferred thereon by the action of the pusher bars 65, from the machine. All of the discharge chutes 87 are supported by a frame structure 89, as clearly seen in Figs. 4 and 8, connected to the uprights 2 at the discharge end of the machine.

Figure 9:
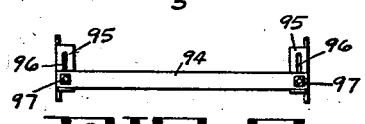
Fig. 9 is a detail view of the control gate associated with the feeding mechanism of the machine of the present invention.

The feeding mechanism B of the apparatus of the present invention consists of a plurality of delivery chutes 90 and a conveyor structure 91 transversely arranged adjacent the forward end of the rolls 38. The delivery chutes 90, which are attached to the frame structure 20 by means of bracing members 92 are each provided with a can twist 93 of conventional construction, for turning the cans delivered thereto from a vertical into a horizontal position and placing the same upon the conveyor 91. Adjacent the discharge end of the delivery chutes 90 and supported by the frame structure 20 is a control gate 94 vertically adjustable with respect to supporting brackets 95, which, for this purpose, are slotted as shown at 96 in Fig. 9 and to which the control gate 94 is secured by means of bolts 97. This control gate regulates the discharge of containers from the delivery chute in a manner specifically described later on.

Figure 6:
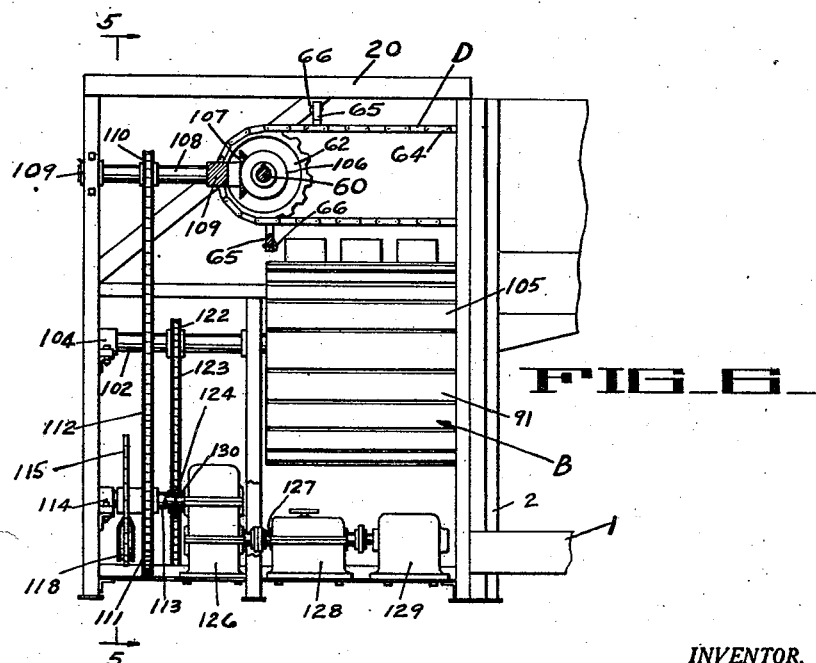
Fig. 6 illustrates a side elevation of the feeding mechanism of Fig. 5, certain portions being broken away while others are shown in section.

Referring now to the conveyor structure 91 as clearly shown in Figs. 5, 6, and 7, it will be noted that the same comprises a pair of endless conveyor chains 98 trained around opposing pairs of sprocket wheels 99 and 100, supported by shafts 101 and 102 rotatably arranged within bearings 103 and 104 respectively, which are secured to the frame structure 20. The sprocket wheels 100 are keyed to the shaft 102 for rotation therewith, so that the endless conveyor chains 98 may be operated in unison. Secured to both of these conveyor chains 98 are conveyor members 105, which extend transversely thereto and parallel to the rolls 38.

These conveyor members 105 are positioned adjacent each other and present a continuous supporting surface of a wave-like configuration in cross section. In other words, the conveyor members 105 are in the form of grooved flights, the valley portions of which are adapted to register with the valleys formed by the receiving ends of the rolls 38 at certain stages in the operation of the machine.

It will therefore be seen that upon transverse travel of the conveyor members relative to the machine during operation of the conveyor mechanism 91, a can or container is discharged by gravity from each delivery chute 90 into the valley portion of each conveyor member as the latter pass the delivery chutes 90. The control gate 94, which controls the admission of cans to the conveyor 91, is so positioned with respect to the hill portions of the conveyor members 105 as to prevent rolling of a can, delivered by a delivery chute 90 into the valley portion of a conveyor member below the chute, toward the valley portion of the adjacent conveyor member, which otherwise would cause a premature discharge of another can into the valley portion of the same conveyor member. In other words, the control gate 94 retains the cans in the valley portion of their respective conveyor member and prevents the admission of another row of cans into the same valley, so that the next row of cans, upon advancement of the conveyor members during the operation of the machine is delivered to the next succeeding conveyor member. It should further be noted that the gate 94 is so positioned as to permit the passage of the cans within the valley portion of a conveyor member during advancement of the same. The conveyor members 105 travel while the valley portions are filled with rows of cans in a transverse direction relative to the receiving ends of the rolls 38 until sufficient cans have been deposited upon the conveyor 91 so as to position one row of cans in alignment with each valley portion between the rolls 38. Thereupon the containers are transferred onto the rolls 38 and into the valley portions formed thereby in a manner explained hereinafter.

During the transfer of the cans from the conveyor members 105 to the valley portions of the longitudinal rolls 38, the movement of the conveyor 91 must be stopped and the carrier chains 64 operated for advancing the pusher bars 65 from the delivery end toward the discharge end of the machine for shifting the cans from the conveyor upon the longitudinal rolls. Therefore, alternate and intermittent operation of the pusher bars 65 and the conveyor mechanism 91 is necessary.

To accomplish the above recited mode of operation of the pusher bars 65 and conveyor 91, the shaft 60 is provided with a bevel gear 106 intermeshing with a bevel gear 107 of a shaft 108 freely rotatable within bearings 109 supported by the frame structure 20 of the machine. Keyed to the shaft 108 is a sprocket wheel 110 adapted to be driven by a sprocket wheel 111 with which it is operatively interconnected by means of a chain 112. The sprocket wheel 111 is keyed to a shaft 113, which is rotatably mounted within the frame structure 20 by means of bearings 114 and which carries fixed thereto a star wheel 115 of a Geneva drive mechanism generally indicated at 116. This Geneva drive mechanism includes further the Geneva driver 117 having a drive roller 118, and another star wheel 119, keyed to a shaft 120 likewise rotatably supported within the frame structure 20. Fixed to shaft 120 for rotation therewith is a sprocket wheel 121 adapted to drive a sprocket wheel 122, keyed to shaft 102, by means of a drive chain 123. The Geneva driver 117 is keyed to a shaft 124, one end of which is supported within the bearing 125, while the other end thereof extends into a gear reduction box 126, operatively interconnecting shaft 124 by means of a train of reduction gears (not shown) to a shaft 127 of a variable speed control mechanism 128, which in turn is coupled to a motor 129 for operation thereby. The shaft 124 is also provided with an idler sprocket wheel 130 to permit passage of the chain 123 without interference with shaft 124.

It will therefore be seen that upon operation of the motor 129 the Geneva driver 117 will be rotated in a counterclockwise direction, as indicated by the arrow shown in Fig. 5, and the drive roller 118 will successively engage the slots 131 and 132 of the star wheels 115 and 119 respectively, thereby causing alternate intermittent rotation of the sprocket wheels 111 and 121. Therefore, when the drive roller 118 engages one of the slots 132 of the star wheel 119 the same will be rotated together with the sprocket wheel 121, effecting rotation of the shaft 102 and operation of the conveyor mechanism for carrying containers, deposited thereon by the delivery chutes 90, transversely across the machine for positioning the same adjacent the valley portions of the rolls 38 and in proper alignment therewith upon disengagement of the roller 118 from its cooperating star wheel slot 132, causing stopping of the conveyor mechanism at such aligned position. The Geneva drive roller 118, however, continues its rotation and will thereupon engage one of the slots 131 of the star wheel 115 and rotation of the latter, shaft 113, and sprocket wheel 110 will effect rotation of shaft 108 operatively interconnected with the transverse shaft 60 by means of the bevel gears 107 and 106. This will cause rotation of the sprocket wheels 62, effecting movement of the carrier chains 64 in a direction as indicated by arrows in Figs. 3 and 4, and the pusher bars 65 of the lower runs 67 of the carrier chains 64 will therefore travel from the delivery end toward the discharge end of the machine. The cans deposited upon the conveyor members 105 will be engaged and shifted by one of the pusher bars adjacent the same from the conveyor members upon the longitudinal rolls 38 and into the valley portions formed thereby. During the time this transfer operation of the cans from the conveyor to the rolls takes place, the conveyor mechanism remains stationary, but is subsequently operated again after the drive roller 118 disengages from its cooperating slot 131 of the star wheel 115 which interrupts the operation of the can shifting mechanism and enters into the next slot 132 of the star wheel 119, whereupon the conveyor 91 effects the positioning of further rows of containers adjacent the valley portions of the longitudinal rolls 38 to be transferred thereon upon the next operation of the can shifting mechanism. In this manner the operation of the machine continues in successive steps until all containers are discharged from the machine.

It will therefore be seen that the containers are advanced along the rolls 38 in an intermittent fashion while they are revolved around their longitudinal axes by the continuously rotating longitudinal rolls 38 to effect agitation of the contents thereof.

The shifting of the containers along the rolls 38 may be effected at any desired speed and in accordance with the requirements of practice for treating various kinds of comestibles upon operation of the variable control mechanism 128, and likewise the rotation of the containers and their contents may be independently regulated to desired conditions upon operation of the variable control mechanism 57.

After the cans have entered the valley portions of the rolls 38 and while the same are continuously rotated and intermittently shifted in a longitudinal direction relative thereto by means of the pusher bars 65, the same enter first the wash compartment 12 where they are cleaned of foreign matter adhering to the same. Thereupon the cans enter the cooking compartment 13 within which they are heated by applying hot water or steam jets thereon, to cause cooking and sterilization of the contents thereof. From the cooking compartment the containers enter into the intermediate section 14 in which further cooking or cooling of their contents may be effected, and thereafter the same pass finally to the cooling compartment 15, in which they are cooled by subjecting the same to streams of cold water discharged from the nozzles 80 for immediately discontinuing the cooking action. Thereupon the pusher bars 65 transfer the cans upon the conveying chutes 87 which discharge the containers from the machine.

During the entire treating operation the cans are continuously rotated so as to agitate the contents thereof to effect uniform cooking and cooling operation throughout the entire mass of their contents. In view of the fact that the agitation of the contents of the containers may be predetermined by adjustment of the speed of rotation of the longitudinal rolls, the heat transfer from the treating medium to the contents of the containers may be critically regulated, and likewise the cooking and cooling period may be independently varied by changing the speed of operation of the can shifting mechanism so that the machine can be easily adjusted in accordance with the requirements of practice, depending upon the necessary cooking time and agitation desired for treatment of various comestible products. By regulating the temperature of the cooking medium a further variation in the heat transfer may be effected, and by utilizing the intermediate treating section 14 as either a cooking or cooling chamber, the cooking time of the products may be further increased or decreased, respectively, as desired.

While reference has been made herein particularly to the treatment of comestible products in closed containers, it will be apparent that the machine may be used for treatment of other objects, and it will be understood that various changes and modifications in the construction of the same may be made without departing from the spirit of the present invention and the scope of the appended claims. It will also be apparent that by closing both valves 85 and 86, the cans may be passed through the intermediate chamber 14 without any treatment.

I claim:

1. In a machine for handling and treating comestibles in containers including a treating chamber, cooperating cylindrical supporting members extending through said chamber and forming valley portions therebetween for supporting the containers, means transversely movable relative to said members for positioning containers adjacent the valley portions thereof, means for transferring the containers to said supporting members and for shifting the same endwise along the valley portions thereof and through said chamber, and means for rotating the supporting members for imparting rotation to the containers during their travel through said treating chamber.

2. In a machine for handling and treating canned goods including a treating chamber, can supporting means within said chamber, a feeding mechanism for positioning cans adjacent said supporting means, a can shifting mechanism for transferring the cans from the feeding mechanism to the supporting means and for moving the cans along the latter and through said chamber, and means for alternately and intermittently operating the feeding mechanism and said can shifting mechanism.

3. In a machine for handling and treating canned goods including a treating chamber, can supporting means within said chamber, a feeding mechanism for positioning cans adjacent said supporting means with their axes parallel to the axes of the can supporting means, a can shifting mechanism for transferring the cans from the feeding mechanism to the supporting means and for moving the cans along the latter and through said chamber, means for alternately and intermittently operating the feeding mechanism and said can shifting mechanism, and means for rotating the supporting means for imparting rotation to the cans.

4. In a machine for handling and treating comestibles in cans including a treating chamber, cooperating cylindrical supporting members extending through said chamber and forming valley portions therebetween for supporting cans, a can feeding mechanism transversely movable relative to said members for positioning cans adjacent the valley portions thereof, a can shifting mechanism cooperating with the feed mechanism and said supporting members for transferring the cans from the feeding mechanism to the valley portions of the supporting members and for shifting the cans endwise along the latter, means for alternately and intermittently operating said feeding and can shifting mechanism, and means for rotating the supporting members for imparting rotation to the cams independent of the operation of the feeding mechanism and said can shifting mechanism.

5. A machine for handling and treating canned goods comprising a treating chamber, can supporting and rotating means within said chamber, a conveyor extending transversely of the can supporting means, can shifting means cooperating therewith, means for intermittently operating said conveyor and can shifting means for transferring the cans from the conveyor to the can supporting means and for advancing the cans endwise along the supporting means, and means for rotating the supporting means independently of the advancement of said cans through said chamber for imparting rotation to the cans.

6. A machine for handling and treating canned goods comprising longitudinally extending rolls spaced with respect to each other for supporting cans with their axes parallel to the axes of said rolls, a conveyor extending transversely of the rolls, can shifting means cooperating therewith, means for intermittently operating said conveyor and can shifting means for transferring the cans from the conveyor to the rolls, and means for continuously rotating said rolls and cans independently of the operation of said shifting means.

7. A machine for handling and treating canned goods comprising longitudinally extending rolls spaced with respect to each other for supporting cans with their axes parallel to the axes of said rolls, conveyor means transversely movable relative to the rolls for positioning cans endwise adjacent said rolls, can shifting means for transferring the cans upon said rolls and for moving the cans therealong, means common to said conveyor and can shifting means for intermittently operating the same in alternate relationship, means for varying the speed of operation of said conveyor and can shifting means, and means for independently rotating said rolls and cans.

8. A machine for handling and treating canned goods comprising longitudinally extending rolls spaced with respect to each other for supporting cans therebetween, a conveyor transversely arranged relative to the rolls for positioning cans adjacent one end of the same, means for delivering cans to said conveyor with their axes parallel to the axes of the rolls, operating means for said conveyor, a can shifting mechanism for transferring the cans from the conveyor upon the rolls and for advancing the cans endwise along the rolls, actuating means for operating the can shifting mechanism, and means common to said conveyor operating means and said actuating means for alternately operating the same.

9. A machine for handling and treating canned goods comprising longitudinally extending rolls spaced with respect to each other for supporting cans therebetween, a conveyor transversely arranged relative to the rolls for positioning cans adjacent one end of the same, means for delivering cans to said conveyor with their axes parallel to the axes of the rolls, operating means for said conveyor, a can shifting mechanism for transferring the cans from the conveyor upon the rolls and for advancing the cans endwise along said rolls, actuating means for operating the can shifting mechanism, means common to said conveyor operating means and said actuating means for alternately operating the same, and means for rotating the rolls and the cans supported thereby.

10. In a machine for handling and treating comestibles in containers including a treating chamber, cooperating cylindrical supporting members extending through said chamber and forming valley portions therebetween for supporting the containers, means transversely movable relative to said members for positioning containers adjacent the valley portions thereof, means adapted to both transfer the containers to said supporting members and to shift the same endwise along the valley portions therebetween and through said chamber, means for rotating the supporting members for imparting rotation to the containers, means dividing said treating chamber into treating sections, and means for admitting treating medium to said sections for treating the contents of the containers during their travel through said treating chamber.

11. In an apparatus for treating canned goods, a treating chamber including a cooking section, a cooling section, and an intermediate section therebetween, separate conduit means for admitting treating medium to said cooking and cooling sections, fluid conduit means for admitting treating medium to the intermediate section, means for selectively interconnecting said fluid conduit means with either one of said separate conduit means, means for collecting the treating medium admitted to the cooking section and the cooling section, and adjustable means intermediate the cooking and cooling sections for selectively discharging treating medium from the intermeidate section to the collecting means of the cooking section or the cooling section.

12. A machine for handling and treating comestibles in containers, comprising a treating chamber, cooperating cylindrical supporting members extending through said chamber and forming valley portions therebetween for supporting the containers, means transversely movable relative to said members for positioning containers adjacent the valley portions thereof, and means for transferring the containers to said supporting members and for shifting the same endwise along the valley portions therebetween and through said chamber.

13. A machine for handling and treating comestibles in containers comprising a treating chamber, cooperating cylindrical supporting members extending through said chamber and forming valley portions therebetween for supporting the containers, means transversely movable relative to said members for positioning containers adjacent the valley portions thereof and in horizontal alignment therewith, and means for transferring the containers to said supporting members and for shifting the same endwise along the valley portions therebetween and through said chamber.

14. A machine for handling and treating canned goods comprising a treating chamber, means for supporting the cans extending through said chamber, a conveyor movable relative to said supporting means for positioning cans adjacent the same, and means extending longitudinally of said supporting means and operable for transferring the cans from the conveyor to the supporting means and for shifting the cans along the same through said treating chamber.

ALBERT R. THOMPSON.